United States Patent [19]

Radkowsky

[11] Patent Number: 4,968,476

[45] Date of Patent: Nov. 6, 1990

[54] LIGHT WATER BREEDER REACTOR USING A URANIUM-PLUTONIUM CYCLE

[75] Inventor: Alvin Radkowsky, Ramat Chen, Israel

[73] Assignee: Touro College, New York, N.Y.

[21] Appl. No.: 378,482

[22] Filed: May 14, 1982

[51] Int. Cl.$^5$ .............................................. G21C 1/04
[52] U.S. Cl. .................... 376/172; 376/182;
      376/346; 376/348; 376/349; 376/351; 376/911
[58] Field of Search ............... 376/171, 172, 173, 182,
      376/346, 348, 349, 350, 351, 911, 347, 463, 381, 458

[56] References Cited

U.S. PATENT DOCUMENTS

| T947,011 | 6/1976 | Radkowsky | 376/173 |
|---|---|---|---|
| 2,852,456 | 9/1958 | Wade | 376/348 |
| 3,154,471 | 10/1964 | Radkowsky | 376/173 |
| 3,252,867 | 5/1966 | Conley | 376/173 |
| 3,335,060 | 8/1967 | Diener | 376/173 |
| 3,351,532 | 11/1967 | Raab, Jr et al. | 376/173 |
| 3,366,545 | 1/1968 | Lewis et al. | 376/911 |
| 3,634,189 | 1/1972 | Germer | 376/911 |
| 3,640,844 | 2/1972 | Shank et al. | 376/173 |
| 3,671,392 | 6/1972 | Beaudoin et al. | 376/173 |
| 3,844,886 | 10/1974 | Crowther | 376/349 |
| 3,859,165 | 1/1975 | Radkowsky et al. | 376/173 |
| 3,957,575 | 5/1976 | Fauth, Jr. et al. | 376/173 |
| 3,960,655 | 6/1976 | Bohanan et al. | 376/173 |
| 4,235,669 | 11/1980 | Burgess et al. | 376/173 |
| 4,243,487 | 1/1981 | Schweiger | 376/381 |

FOREIGN PATENT DOCUMENTS 2008838 6/1979 United Kingdom ............... 376/348

*Primary Examiner*—Charles T. Jordan
*Assistant Examiner*—Richard W. Wendtland
*Attorney, Agent, or Firm*—Marks Murase & White

[57] ABSTRACT

A light water cooled and moderated nuclear reactor for breeding fissile material on a uranium-plutonium cycle and also a method of operating a light water cooled and moderated reactor having a prebreeder section fueled from plutonium extracted from fuel discharged by a uranium burner or converter burner core. Subsequently, the prebreeder section, together with a breeder section, operated as coupled cores or modules, becomes self-sustaining and able to breed fissile plutonium fuels at a relatively high rate of gain.

38 Claims, 6 Drawing Sheets

FIG. 1 VALUES OF ETA ($\eta$) FOR FISSILE FUELS AS A FUNCTION OF NEUTRON ENERGY

TYPICAL SEED SUBCELL
FIG. 4A
TYPICAL BLANKET SUBCELL
FIG. 4B
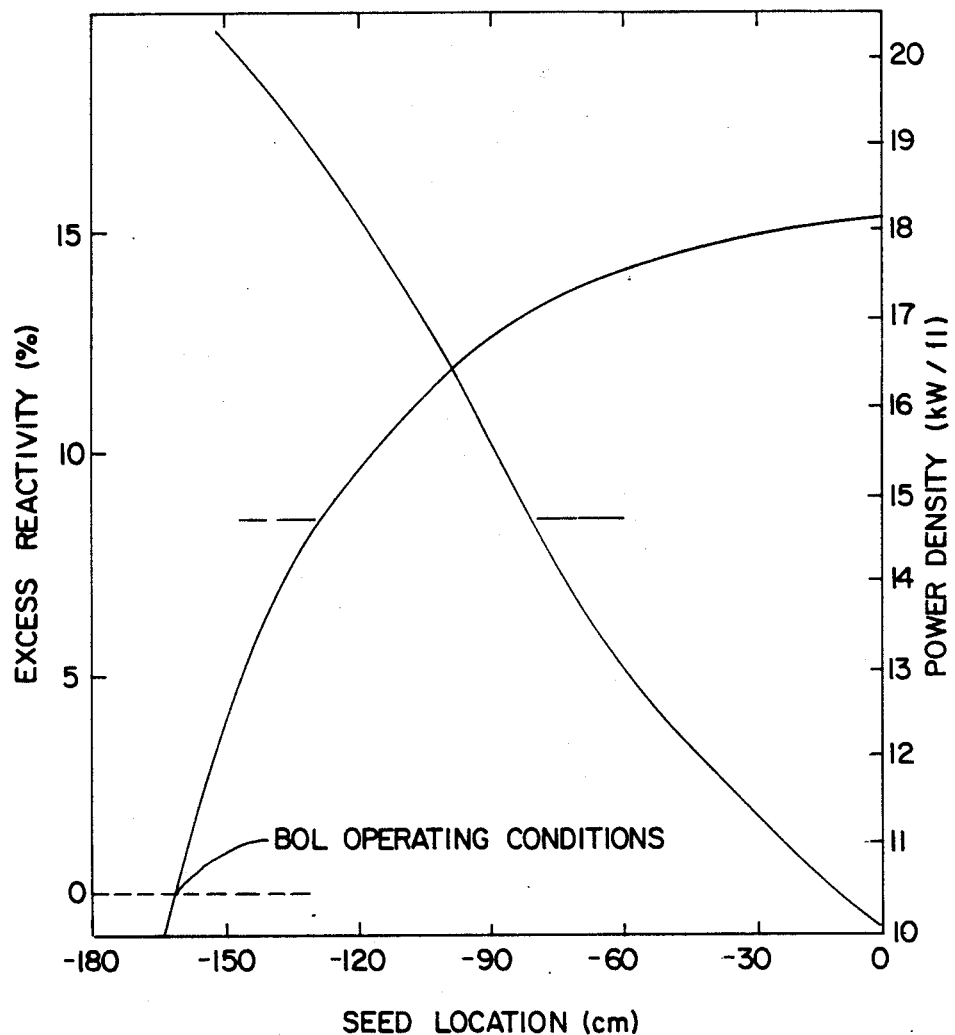
FIG. 5

LIGHT WATER BREEDER REACTOR USING A URANIUM-PLUTONIUM CYCLE

Field of the Invention

The present invention generally relates to a light water cooled and moderated nuclear reactor capable of high gain breeding on the uranium-plutonium cycle.

The present invention also generally relates to a method of operating a nuclear reactor having a light water cooled and moderated active core and which is capable of high gain breeding on the uranium-plutonium cycle.

More particularly, the present invention relates to a pressurized, or boiling light water moderated and cooled, epithermal spectrum, nuclear breeder reactor and the method of operating same.

Background of the Invention

For clarity and precision, specific terminology used in this specification is defined as follows:

Active Core: The central portion of a nuclear reactor which contains fissile and fertile material and in which the fission chain is sustained and most of the energy of fission is released as heat.

Blanket Region: An active core region immediately surrounding a seed region containing predominantly fertile material and characterized by conversion of the fertile material into fissile material by neutron capture.

Breeder Reactor: A nuclear reactor which produces a fissile material to replace that used to maintain the fission chain. Further limited herein to nuclear reactors which produce more fissile material than they consume.

Breeding Ratio (eta): The ratio of the number of fissile atoms produced to the number of fissile atoms that have been consumed.

Conversion Ratio: The ratio of the instantaneous rate of production of fissile atoms to the instantaneous rate of destruction of fissile atoms.

Doubling Time: The time required for a breeder reactor to produce a surplus amount of fissile material equal to that required for the initial charge of inventory of the reactor, after accounting for reprocessing and refabrication losses.

Epithermal Reactor: A nuclear reactor characterized by a neutron energy spectrum in which more than half of the fissions result from the absorption of neutrons having energies above 0.6 electron (0.6 ev) and a moderating power per fissile atom ($\xi\Sigma/NU$) less than 1000.

Fast Energies: A nuclear reactor characterized by a neutron energy spectrum in which more than half of the fissions result from the absorption of neutrons having energies greater than 200,000 electron volts (0.2 Mev) and a moderating power per fissile atom ($\xi\Sigma/NU$) less than 10.

Fertile Material: Material which can be converted into fissile material through neutron capture; for example thorium-232 and uranium-238 fertile materials are converted respectively to uranium-233 and plutonium-239 fissile material.

Fissile Material: Material which will undergo fissions with neutrons of all energies; including thermal to fast neutrons; for example uranium-233, uranium-235 and plutonium-239.

Fuel: Designates either fissile or fertile material or a combination of both.

Intermediate Reactor: A nuclear reactor characterized by a neutron spectrum in which more than half of the fissions result from the absorption of neutrons having energies above 3,000 electron volts (3 kev) and a moderating power per fissile atom ($\xi\Sigma/NU$) less than 200.

Module: One of a plurality of fuel units comprising an active core region.

Module Geometry: The geometrical configuration of a nuclear reactor having modules dependently nuclearly coupled to form an active core.

Movable Region: An active core fuel region disposed for longitudinal movement, in reference to a stationary fuel region during normal reactor operation.

Seed Region: An active core region containing substantial fissile material and characterized by neutron leakage to a blanket region.

Stationary Region: An active core fuel region which remains fixed during normal reactor operation.

Thermal Reactor: A nuclear reactor characterized by a neutron spectrum in which more than half of the fissions result from the absorption of neutrons having a substantially Maxwellian number-energy distribution about an energy value equal to KT, where K is a constant and T is the reactor temperature in degrees Kelvin and a moderating power per fissile atom ($\xi\Sigma NU$) greater than 1,000. In such a reactor, more than half of the fissions result from the absorption of neutrons having neutron energies below 0.6 electron volts (0.6 ev).

Variable Geometry Control: A means of reactivity control by axially positioning a movable region with respect to a stationary region and thereby changing the leakage of neutrons from the movable region to the stationary region.

U.S. Pat. No. 2,708,656 issued to E. Fermi et al on May 17, 1955, describes physics principles applicable to nuclear reactors. U.S. Pat. No. 2,832,733 issued to L. Szilard on Apr. 29, 1958, describes physics principles applicable to heavy water moderated reactors. *Nuclear Reactor Engineering*, by Samuel Gladstone and Alexander Sesonske, prepared under the auspices of the Division of Technical Information, U.S. Atomic Energy Commission, Van Nostrand Reinhold Company (1967), describes general terminology used in this specification. The *Nuclear Engineering Handbook*, edited by H. Etherington, First Edition, McGraw-Hill Book Company (1967) generally describes the mechanical design and operation of reactors.

According to current information, there is believed to be only enough high grade uranium supplies, at present and prospective rates of usage, to last for about 50 years. The Light Water Reactors (LWR), which are the most prevalent type of nuclear reactors in use today, use up only about 1% of the potential energy of their uranium fuel since the uranium-238 isotope, which constitutes 99.3% of natural uranium, is largely unused. A breeder reactor converts the uranium-238 to plutonium, which is fissionable, and thus in principle, permits nearly the entire energy of the uranium to be utilized.

Up to now, it has been considered impossible to perform the breeding process, except possibly at a very low rate, in a light water reactor core. It has, therefore, been necessary to cool the reactor by some other coolant than water. The usual coolants selected have been sodium, steam, or helium. Such reactors are known as fast reactors because the average energy of the neutrons produced is much higher than in light water reactors. Fast breeder reactors are still under development with resulting expenditures totaling many billions of dollars per year worldwide. In order to use these fast reactor cores, new plants will be required, inasmuch as the fast reactor cores under development are not structurally compatible with existing LWR plants.

In the past it has been assumed that with light water it was possible to breed only on the thorium cycle and then only with almost infinitely long doubling times, as in the so-called Light Water Breeder Reactor (LWBR).

Furthermore, extremely high fissile fuel loadings are required for the thorium light water breeder so that very few cores could be started up with available uranium resources. The LWBR demonstration core has two to three times as much fissile fuel per MWe as the LMFBR, and only half the power density necessary to render it a suitable replacement core for standard PWRs. Reprocessing on the thorium cycle, and fabrication of uranium-233 into fuel elements, would be extremely costly and impractical because of the high gamma activity of the irradiated fuel and the difficult thorium chemistry.

In developing breeder reactors it is desirable to achieve short doubling times in order to be able to fuel the increasing number of nuclear reactors which will be required if the world's energy demands continue to increase.

As stated above, it is advantageous for breeders to have short doubling times. Doubling times may be shortened and breeding gains improved by reducing parasitic absorption of neutrons in non-fissile and non-fertile material such as core structural material cladding, moderator, and fission products and also by reducing neutron leakage of neutrons from the reactor core and also by providing a fissile fuel and a neutron energy spectrum wherein a maximum number of neutrons is liberated per average neutron absorption by the fissile fuel; this quantity is known as $\eta$.

Several different breeder reactor concepts have been proposed n the past. For Instance. In U.S. Pat. No. 4,235,669 to Burgess et al, there is disclosed a nuclear reactor composite fuel assembly for a liquid-cooled breeder which is intended to provide a high breeding ratio and low doubling time. The reference discloses specific structural geometry but does not address the fuel cycle specifically.

U.S. Pat. No. 4,096,033 to Barry discloses a core for a water moderate reactor having tandem arranged fuel regions; an upper region of enriched uranium oxide, a lower region of plutonium oxide and an intermediate region of natural uranium oxide. This invention is directed towards alleviating prior art problems associated with the impact of plutonium on control rod worth and minimizing the effect of the strong plutonium moderator temperature coefficient of reactivity on control requirement. The patent does not teach any method or apparatus For accomplishing high gain breeding in an LWR.

in U.S. Pat. No. 3,998,692 to Sohanan et al, there is disclosed a light water nuclear reactor for breeding $U^{233}$. While the reference does disclose the use of $U^{235}$, that fuel is associated with $U^{238}$ as a dilutant. Also while the reference does disclose the use of $Pu^{239}$, it does so with $Th^{232}$ as a dilutant. There is no teaching of accomplishing high gain breeding in a LWR on the uranium-plutonium cycle.

In U.S. Patent No. 3,960,655 to Bohanan et al al, there is disclosed another aspect of the nuclear reactor for breeding $U^{233}$ discussed above with regard to U.S. Pat. No. 3,998,692.

In U.S. Pat. No. 3,957,575 to Fauth, Jr. et al, there is disclosed the mechanical design for a LWBR using a $Th^{232}$-$U^{233}$ fuel system in a seed blanket modular core configuration.

In U.S. Pat. No. 3,859,165 to Radkowsky et al, there is disclosed an epithermal to intermediate spectrum pressurized heavy water breeder reactor.

In U.S. Pat. No. 3,671,392 to Beaudoin et al, there is disclosed a LWBR of the seed blanket type characterized by core modules comprising loosely packed blanket zones enriched with fissile fuel and axial zoning in the seed and blanket regions within each core module.

In U.S. Pat. No. 3,640,844 to Shank et al, there is disclosed a power-flattened seed-blanket reactor core. The flattened power density distribution is achieved with selective loading of fissile material in the reactor core.

In U.S. Pat. No. 3,351,532 to Raab, Jr. et al, there is disclosed a seed-blanket converter-recycle breeder reactor having $U^{233}$ fuel, a $Th^{232}$ blanket and light water coolant.

None of the references described above provide apparatus for or teach a method for accomplishing high gain breeding in a LWBR on the uranium-plutonium cycle, nor do they teach a method to use existing LWR technology to accomplish the above.

SUMMARY OF THE INVENTION

It is therefore an object of this invention to provide a method and apparatus for accomplishing high-gain breeding in a LWR on the uranium-plutonium cycle.

It is a further object of the present invention to provide such a LWR using established LWR technology thereby the cores of the present invention will be suitable as replacements in existing LWR nuclear plants.

It is a further object of the present invention to provide a breeder core having a negative void effect whereby in the case of a loss of coolant accident the reactivity promptly decreases, tending to shut the plant down.

It is a further object of the present invention to provide a LWBR with a shortened doubling time.

It is a still further object of the present invention to provide an LWR which is capable of breeding on the same time scales as a Liquid Metal Fast Breeder Reactor (LMFBR) but which avoids the huge capital costs and dangers of sodium technology.

These and other objects are accomplished by providing a light water cooled and moderated nuclear reactor capable of high gain breeding, comparable to that of Liquid Metal (sodium cooled) Fast Breeder, but on the uranium plutonium cycle. The active core comprises a plurality of modules each including a center seed region which is designed to have a multiplication factor greater than unity; a surrounding blanket region which is designed to have a multiplication factor less than unity; and a provision for moving the seed to provide the necessary reactivity control n the manner known as "geometry control", as described in U.S. Pat. No. 3,154,471, to A. Radkowsky granted Oct. 27, 1964. The present invention utilizes two types of modules known as prebreeder and breeder, respectively, which normally will be asembled to make separate prebreeder and breeder cores in separate pots or pressure vessels. As explained hereinbelow, however, it is also feasible to assemble both types of modules to form a single composite core.

In accordance with one aspect of the invention, the prebreeder s fed by plutonium discharged from a standard Pressurized Water Reactor (PWR). The prebreeder effectively produces a partial isotopic separation of the plutonium isotopes so that the plutonium it discharges is relatively high in $Pu^{240}$ and $Pu^{241}$ content. This plutonium is fed into the breeder, which has a breeding ratio of approximately 1.40. Fuel discharged from the breeder has a relatively low $Pu^{240}$ and $Pu^{241}$ content and is used to fuel other cores as well as the prebreeder.

Preferably, the breeder is made up of identical breeder type modules, these modules have very little mutual interaction. The prebreeder likewise is preferably made up of identical prebreeder modules, and as is the case with the breeder modules, the prebreeder modules have very little mutual interaction. It is thus possible to combine breeder and prebreeder modules in a single core.

More specifically, there is disclosed a method of operating nuclear reactors having active cores as described above such that at the time of start-up the prebreeder is fueled from the plutonium extracted from fuel discharged by a uranium burner or converter burner core. The isotopic content is in the range of about 55% $Pu^{239}$, 25% $Pu^{240}$, and 20% $Pu^{241}$. Subsequently, the prebreeder and breeder combination, operated as coupled cores or modules, becomes self-sustaining and able to breed fissile plutonium fuels at a high rate of gain.

In accordance with an aspect of the present invention, the basic function of the prebreeder, which has a breeding ratio of about one, is to separate as much as possible, the plutonium-240 and 241 isotopes from the plutonium-239. This is accomplished by loading the plutonium into separate fuel elements composed of materials having low neutron absorption such as zirconium, zircalloy, ZrO, BeO, PbO and BiO. In this regard, it is noted that both Pb and Bi have oxides with a melting point far above the boiling point of pressurized water. Preferably, the fertile material is loaded into the core in the form of depleted uranium oxide fuel elements. Both types of fuel elements i.e., plutonium and uranium) are suitably clad with low absorbing material such as zirconium. The design of the core is such that practically all the energy can be removed from the plutonium bearing fuel elements. During the course of core operation, the isotopic content of the plutonium bearing fuel elements becomes converted to a relatively high proportion of plutonium-240 and 241.

The prebreeder has an average conversion ratio of about unity over a seed cycle. At the end of one cycle of seed operation, the fuel in the plutonium bearing elements s processed separately and serves as the feed fuel for the breeder. The prebreeder thus performs the function of a partial isotopic separation of plutonium-240 and 241.

The breeder fuel element will be similar to those of the prebreeder except that plutonium discharged from the plutonium fuel elements of the prebreeder will be used as the fuel for the plutonium fuel elements of the breeder, including feedback discharged from the breeder plutonium fuel elements as shown in FIG. 7. The fuel discharged from the uranium rods of both the breeder and prebreeder modules will be fed back to the conventional light later reactors as shown in FIG 7.

Cores produced in accordance with the present invention will be suitable as replacements for present light water power plants. This affords the present invention the dual advantages of being able to make use of existing capital plants which represent a major financial investment and at the same time utilize proved LWR technology.

These advantages lead to the consequent advantage of saving the time, costs and safety problems associated with developing an LMFBR industry as well as avoiding the sodium void problems present in LMFBRs.

Additional objects, advantages and novel features of the invention will be set forth in part in the description which follow, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification illustrate the present invention and, together with the description, serve to explain the principles of the invention. In the drawings:

FIGS. 4A and 4B are schematic illustrations of a typical blanket subcell and a typical seed subcell, respectively, of FIGS. 3A and 3B.

FIG. 5 is a graph illustrating the maximum power density and reactivity as a function of the location of the moving seed.

DETAILED DESCRIPTION OF THE INVENTION

Figure 1:
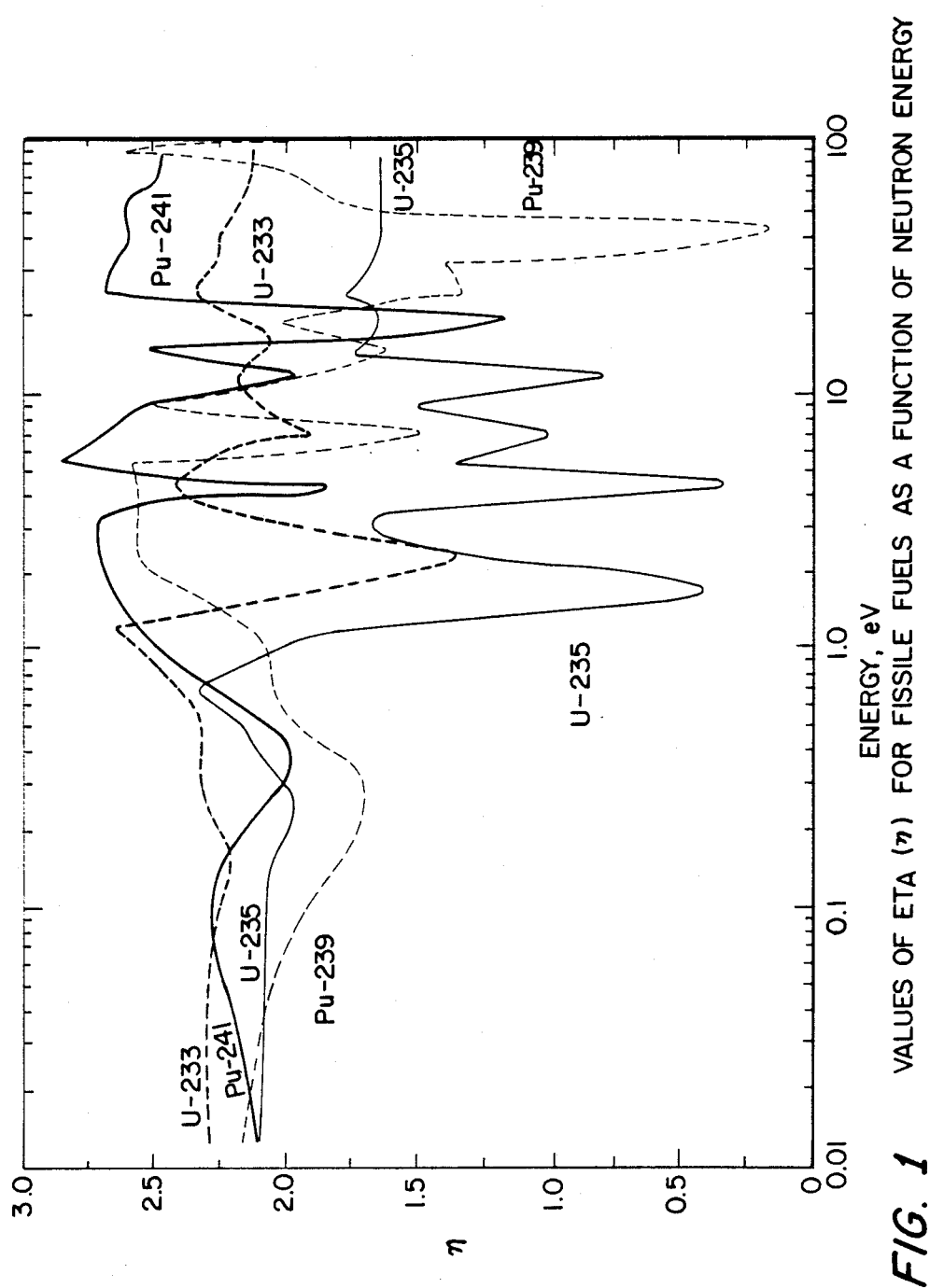
FIG. 1 is a graph illustrating the variation of $\eta$ for the various fissile isotopes in the thermal and epithermal energy range.

Heretofore it had been conventionally considered impossible to breed with plutonium in a light water reactor because the value of eta or ratio of number of neutrons produced over the number of neutrons absorbed was thought to be too low. The minimum value of eta for breeding is 2, after satisfying losses. While the value of eta of Pu-239 is slightly above two at thermal energies, in a power reactor many absorptions occur in the epithermal range where the value of eta for Pu-239 is well below two. Applicant, however, has now realized that such breeding is possible taking into account the effects of Pu-241, which, as shown in FIG. 1, has an extremely high value of eta at epithermal energies.

In fact, Pu-241 has excellent values of eta, better than U-233, except in the thermal range. Furthermore, the effective value of eta is increased about 13%, sometimes even more, in a close packed uranium lattice because of the high fast effect in uranium-238, about five times as great as in thorium. In some other respects the thorium cycle is relatively poorer for breeding than the uranium plutonium cycle. For example, U-233 has a smaller total absorption cross section than plutonium, so that the fraction of losses to structure, coolant, and fission products tends to be greater. Also, U-233 has a long lived precursor, protactinium, with considerable absorption. Every neutron captured by protactinium is equivalent to a double loss in regard to breeding.

At energies where the eta of Pu-239 is low, it is not because neutrons are lost but because they are used to form Pu-240. Investigating an entire cycle it can be shown that the feasibility and potential for a large breeding gain in a close packed lattice which operates at epithermal energies can be established. The average eta for Pu-239 is about 1.90; but this eta ratio is supplemented by the fast fissions in U-239 to about 2.20. There will be about 0.33 Pu-240 nuclei created for each Pu-239 destroyed. The eta of Pu-241 while only slightly above two in the thermal range, in the epithermal range is about 2.8, which when supplemented by fast fissions becomes about 3.3. With 1.66 neutrons input (one absorbed by Pu-239, 0.33 absorbed by Pu-240 to form Pu-241 and 0.33 absorbed by Pu-241) we will have an output of 2.20 neutrons from the Pu-239 plus 1.10 more from the Pu-241 for a total of 3.30, or 1.64 surplus neutrons for the loss of one fissile nucleus of Pu-239 from the original fissile inventory. Thus, the fuel cycle of the present invention produces an excellent potential breeding gain of 64% in the epithermal spectrum. In addition, in such a spectrum the losses from parasitic absorption may be reduced which also helps breeding in the manner previously noted.

What heretofore has limited the breeding is the reduction of reactivity due to the creation of fresh Pu-240 by the destruction of Pu-239, which necessarily forms the major portion of the fissionable fuel. Accordingly, it was heretofore felt that the cycle would run out of reactivity long before it could go through the entire cycle described above, and that it would be necessary to shut down the core and recycle it at a point where it had obtained only a very modest gain in fissile fuel. This concern is obviated in the present invention.

Assuming core parameters similar to those of LWBRs, but operating on the uranium plutonium cycle, we find that most of the fission neutrons are produced from neutrons absorbed in the resolved resonance or low epithermal energy region. The percentages of fission neutrons produced by absorptions in each group or region are approximately as follows:

| | |
|---|---|
| Thermal, | 8.9% |
| Low epithermal, | 53.2% |
| High epithermal, | 16.3% |
| Fast | 21.4% |

The actual discharge plutonium fuel from a PWR with a uranium cycle typically has the following approximate isotopic composition:

| | |
|---|---|
| 55% | Pu 239 |
| 22% | Pu 240 |
| 18% | Pu 241 |
| 5% | Pu 242 |

Such fuel has an initial conversion ratio in the range of 1.10 to 1.12, in close packed uranium lattice. Plutonium-241 has an initial conversion ratio of about 1:70 or more.

It is clear that by converting a considerable portion of the Plutonium-239 to Plutonium-241 we achieve a conversion ratio of a high value, similar to that of a fast breeder.

The type of core concept most suited to the present light water breeder application is the so-called seed blanket.

Figure 2:
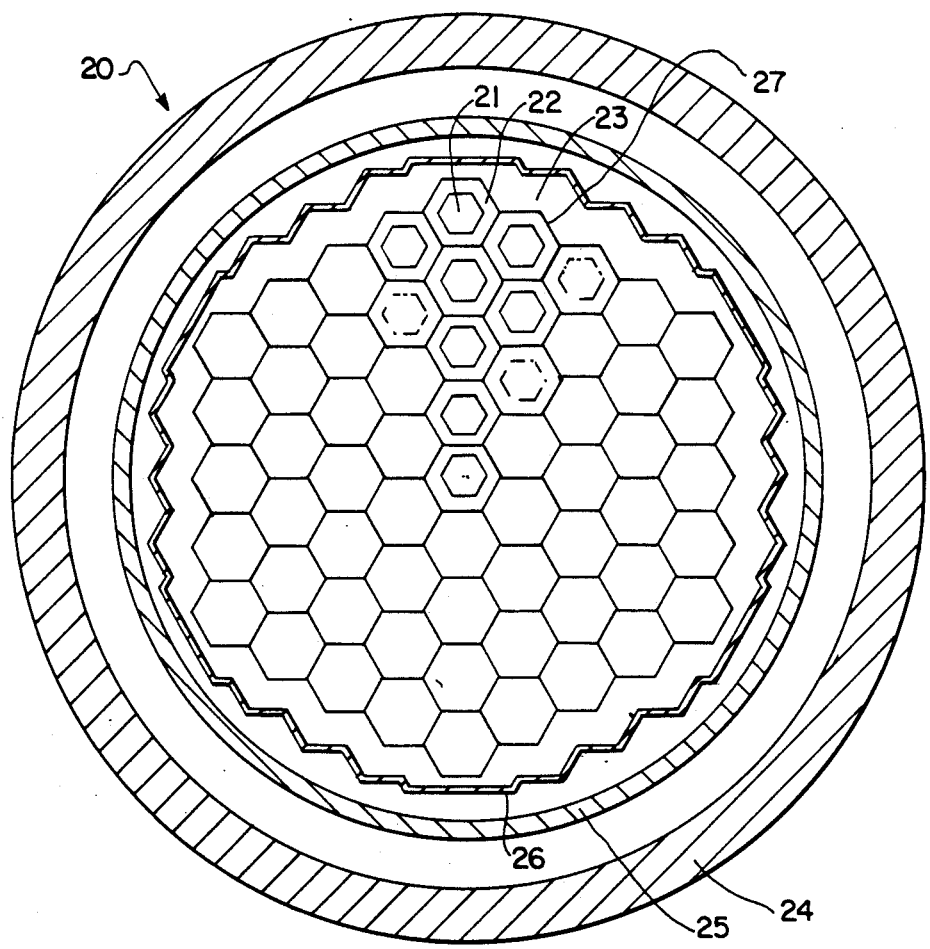
FIG. 2 illustrates the prebreeder and breeder core cross section.

A preferred seed/blanket core basically consists of units, as shown in FIG. 2, each of which consists of a seed and blanket region.

The seed region of the present invention has a high multiplication factor and a small (volume(but sufficiently large to approach criticality). The seed acts essentially as a source of neutrons for the blanket.

The blanket, which is subcritical, surrounds the seed.

A seed blanket core has the following advantages of key importance from a breeding standpoint:

(1) Highly negative moderator coefficient of reactivity. If the water is lost from the core, the reactivity is reduced, even if both seed and blanket were to separately gain in reactivity. Such reactivity gains are offset by the greater leakage from the highly reactive seed to the subcritical blanket. In contrast the design of liquid metal cooled breeders, LMFBR, has been plagued by the positive sodium void coefficient, which means that a loss of sodium tends to increase reactivity. This constitutes a safety hazard.

(2) Feasibility of "geometry control". The concentration of reactivity in the seed and the relatively small seed volume permit all reactor control to be accomplished by axial motion of the seed, which results in regulating the flow of neutrons into the fertile material in the blanket, rather than wasting the neutrons by absorption in parasitic control material.

In order to obtain a high breeding gain in a LWB, the present invention may use two types of reactor modules:

, A prebreeder which separates Pu-239 from the plutonium input fuel as well as converting Pu-240 to Pu-241.

A breeder which operates with the high Pu-241 content fuel discharged from the prebreeder.

The breeder and prebreeder are made up of unit seed/blanket modules. They could be modules of the same reactor core.

Turning to FIG. 2, there is illustrated a core cross section of the prebreeder or breeder in accordance with the present invention. It will be understood that this core cross section is exemplary only and as will be apparent to one of skill in the art, modification on the basic core cross section structure can be made within the spirit and scope of the present invention.

Numeral 20 generally denotes a prebreeder or breeder core cross section which includes a plurality of seed portions 21, each surrounded by a blanket 22. Enclosing the plurality of seed portions and blankets is a power flattening region 23. Encasing the power flattening region, is the core baffle 26. Radially outward from the core baffle 26 are the thermal shield 25 and pressure vessel 24, successively. A seed portion 21 and blanket 22 together form a seed blanket module 27.

Figure 3A:
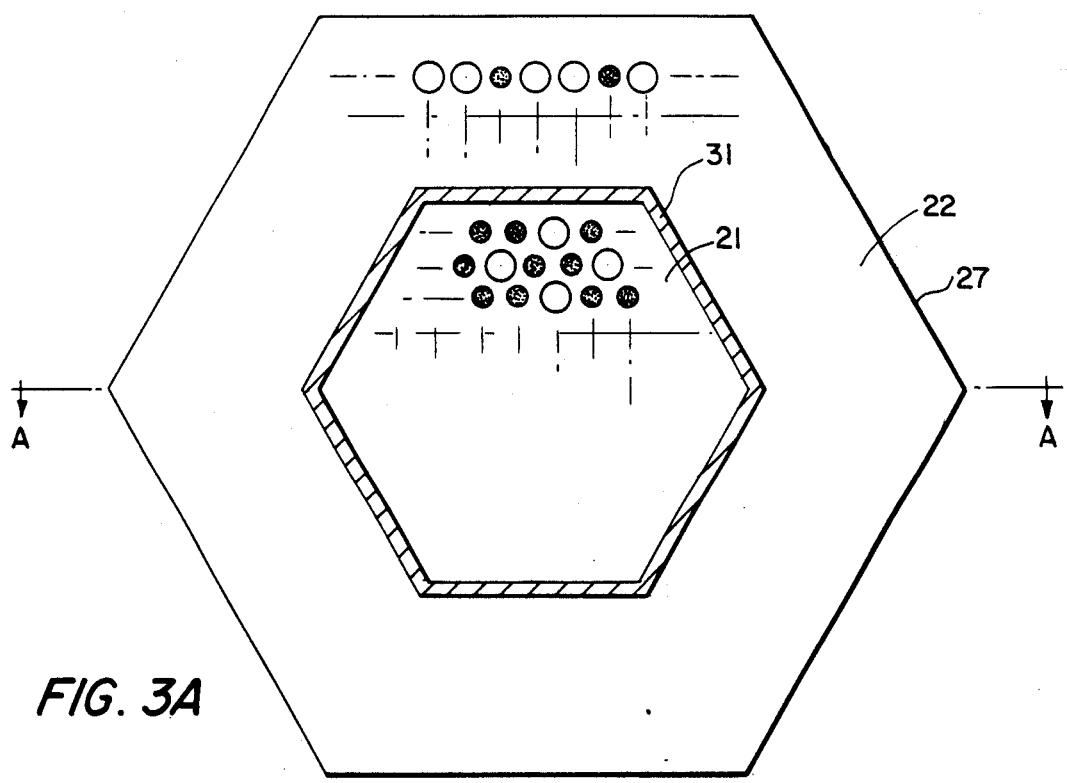
FIGS. 3A and 3B illustrate horizontal and vertical cross sections, respectively, through a typical module of either the prebreeder or breeder.
Figure 3B:
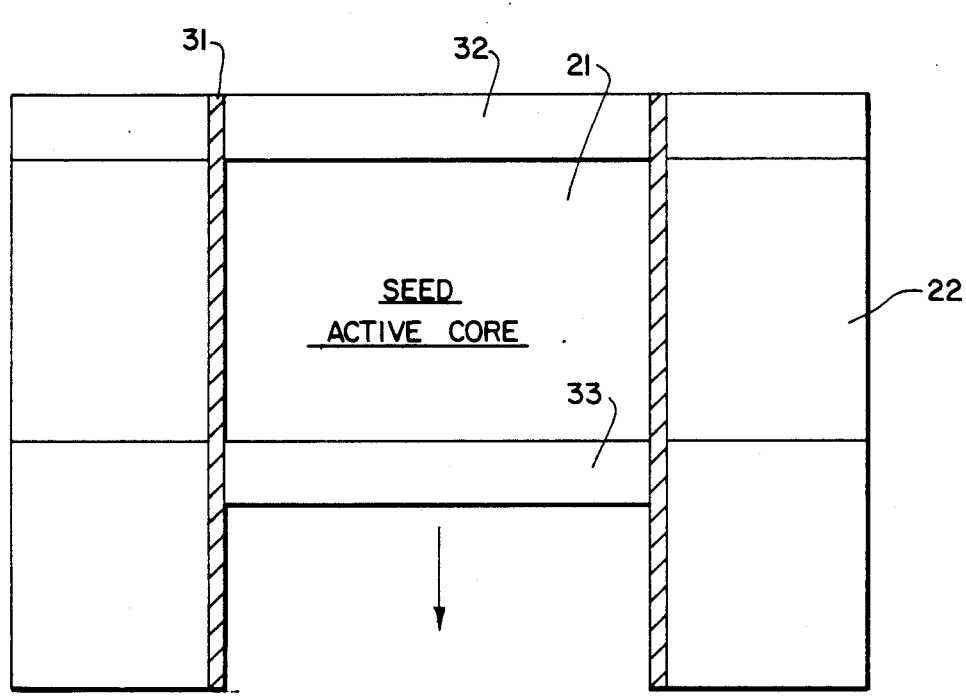

Turning now to FIGS. 3A and 3B, there are depicted horizontal and vertical cross sections through a typical seed blanket module 27 of FIG. 2. The module contains a seed region 21 which is composed of a plurality of seed subcells 40 (as in FIG. 4A). Each subcell comprises a relatively large diameter $UO_2$ fuel rod 42 surrounded by six relatively small diameter Pu fuel rods 41 clad with Zr or other low neutron absorbing material. It should be understood that the exact geometry depicted is only exemplary and that more or less than six Pu-Zr fuel rod scan be used and more than a single UO₂ fuel rod can be used. Surrounding the seed region 21 is a shroud 31 enclosed by the blanket 22. The blanket 22 comprises a plurality of blanket subcells 43, (in FIG. 4B) each of which typically consists of a central relatively small diameter Pu fuel rod surrounded by a plurality (e.g., six) of relatively large diameter UO₂ fuel rods. In a typical module of the dimensions suggested below, the seed region 21 will contain 721 rods and the blanket region a total of 924 rods. It should be understood, however, that such specifications are only exemplary and other sizes, configurations, geometries and fuel rod arrangements can be used within the spirit and scope of the present invention.

FIG. 3B is a vertical cross section through section AA of the seed-blanket module of FIG. 3A. The vertical section illustrates the upper axial reflector region 32 positioned on the top of the seed active core 21. The upper axial reflector region will typically have a height of about 1 foot and the seed active core will typically have a height of about 5 feet. The lower axial reflector region 33 will typically have a height of about 1 foot.

To achieve the advantage that the core fit a standard 1000 to 1200 MWe PWR pressure vessel requires that the core equivalent radius does not exceed 171 cm. Thermohydraulic and heat removal considerations result in an active core height of about 183 cm. (6 feet). The axial core reflector regions of 1 foot and top and bottom (FIG. 3B) of the seed unit result in a total seed height of about 8 feet. The blanket 22 extends 5 feet below the active core 21 and 1 foot above the active core. The core preferably has about 61 seed-blanket subassemblies, as shown in FIG. 2 and is surrounded by a power flattening region 23 to improve power distribution. Exemplary detailed core design parameters are given below in Table 1.

TABLE 1

Exemplary Prebreeder Core Design Parameters

| | |
|---|---|
| Core Radius | 171 cm. |
| Core active height | 183 cm. |
| Core total height | 244 cm. |
| # of subassemblies | 61 |
| Core Pu loading | 4109 kg. |
| Fissile Pu loading | 3000 kg. |
| UO₂ in active core | 55670 kg. |
| # of fuel pins in core | 59055 |
| # of UO₂ pins in core | 67595 |
| Core coolant inlet temperature | 285.5° C. (546° F.) |
| Core coolant exit temperature | 324° C. (616° F.) |
| Core T | 38.9° C. (70° F.) |
| Coolant flow | 14443 kg./sec |
| Theraml Power | 3000 MWt |
| Electrical Power | 1000 MWe |
| Core P | 60 psi |

As detailed hereinabove, a cross section through a typical exemplary seed blanket unit is presented in FIGS. 3A and 3B.

In accordance with the example presented, the typical size of seed 21 is 23.93 cm. and that of the blanket 22 (flat to flat distance) is 38 cm. The hexagonal shroud 31 separating the seed from the blanket has a thickness of about 0.5 cm. and will be constructed either of zircalloy or stainless steel. Each seed assembly 21 typically contains 521 Pu-Zr (or as stated previously, other materials of low neutron absorption may be substituted for the Zr) fuel pins and 200 UO₂ pins. Each blanket 22 typically contains about 314 Pu-Zr fuel pins and 670 UO₂ pins.

The fuel pins are arranged in a hexagonal lattice, preferably having a pitch of about 0.891 cm. The Pu-Zr fuel pins have a VM/VF=0.65 and the UO₂ pins a VM/VF=0.2. Details of a typical exemplary seed blanket subassembly are summarized below in Table 2.

TABLE 2

Exemplary Preliminary Design Parameters of HGLWBR Seed-Blanket Unit

| | |
|---|---|
| Number of seed blanket units | 61 |
| Seed size (flat to flat) | 23.93 cm. |
| Shroud | 25 cm. |
| Blanket | 38 cm. |
| # Pu—Zr pins in seed | 521 |
| # Pu—Zr pins in blanket | 314 |
| # UO₂ pins in seed | 200 |
| # UO₂ pins in blanket | 670 |
| Active core height | 183 cm. (6 feet) |
| Axial reflector region | 30.5 cm. (1 foot) |
| Total seed height | 244 cm. (8 feet) |
| Total blanket height | 366 cm. (12 feet) |
| Pitch (seed & blanket) | 0.891 cm. |
| Average power in 1 S—B unit | 44 MW |
| Average T in seed | 46.2° C. |
| Average T in blanket | 16° C. |

The design parameters presented above should be construed as guide lines in the design of the seed blanket fuel pins and should not in any way be construed to limit the invention to the precise form disclosed.

Presented below in Table 4 are exemplary fuel pin design parameters for a HGLWBR. The higher linear power rating for the Pu-Zr metal pin as compared to oxide fuel used in LWR results from the much higher fuel conductivity of the metal fuel. In order to obtain a favorable conversion ratio, VM/VF should be as small as practically possible, in other words, tight lattice design.

The resulting Pu enrichment is about 17.30 (W/O) in Zr metal, assuming light water reactor discharge plutonium with the composition as previously given. The Pu-Zr fuel pin typically has a radius of about 0.37 cm. while the UO₂ pin (depleted Uranium 0.3% U-235) has a typical radius of about 0.427 cm. Both have a Zirconium cladding with a typical thickness of about 0.06 cm. The resulting WM/VF for the Pu fuel rod is 0.6 while for UO₂ fuel rod it is only 0.2. Typically, each Pu-Zr fuel rod contains about 69.6 gr. of Pu and 330 gr. of Zr. To remove the heat produced in the average fuel rod the resulting flow velocity around the fuel rod should be approximately 9.6 m/sec (113396 ft/hr), while for a UO₂ fuel rod the coolant velocity should be approximately 6.03 cm/sec (71220 ft/hr). This exemplary fuel rod design data is summarized below in Table 3.

TABLE 3

Exemplary Fuel Pin Design Parameters of HGLWBR

| | |
|---|---|
| Pu—Zr Fuel Rod: | |
| Smeared Fuel Pellet Radius | 0.31 cm. |
| Cladding External Radius | 0.37 cm. |
| Equivalent Coolant Channel Radius | 0.468 cm. |
| VM/VF | 0.6 |
| Fuel Enrichment | 17.3% W/O |
| Fuel Composition Pu-239 | 55% |
| Pu-240 | 22% |
| Pu-241 | 18% |
| Pu-242 | 5% |
| Average Flow Velocity | 9.6 m/sec (113386 ft/h) |
| UO₂ Fuel Rod: | |
| Smeared Fuel Pellet Radius | 0.367 cm. |
| Cladding External | 0.427 cm. |

TABLE 3-continued
Exemplary Fuel Pin Design Parameters of HGLWBR

| | |
|---|---|
| Equivalent Coolant Channel Radius | 0.468 cm. |
| VM/VF | 0.2 |
| Composition | depleted UO$_2$ (0.3% U-235) |
| Flow Velocity | 6.03 m/sec (71220 ft/h) |

Calculations for a Seed Blanket unit are summarized in Table 4 and in FIG. 5 which plots seed location as a function of percent excess reactivity and as a function of power density. It is seen from FIG. 5 that with a typical seed fully inserted, the excess reactivity is about 15% at operating temperatures. This excess reactivity is sufficient to compensate for temperature, Xenon and burnup.

It can also be seen from FIG. 5 that the maximum linear density increases as the seed is withdrawn from the core. The maximum is about 20 KW/ft at the beginning of life when the seed is at its lowest position. This increase in the maximum linear power density is due to the large axial flux asymmetry when the seed is withdrawn from the core. In no case does the linear power density exceed the limit of about 24 KW/ft.

TABLE 4
Exemplary Reactor Parameter Variation as Function of Seed Location

| | Position (cm) | Reactivity keff | Power in seed | Max power dens - kw/ft |
|---|---|---|---|---|
| 1. | −162.23 | 0.9944 | 51.4% | 19.6 |
| 2. | −152.5 | 1.0278 | 50.8% | 20.3 |
| 3. | −122.0 | 1.0933 | 50.9% | 18.4 |
| 4. | −91.5 | 1.1239 | 51.1% | 15.9 |
| 5. | −61.0 | 1.1398 | 51.1% | 13.2 |
| 6. | −30.5 | 1.1487 | 51.2% | 11.5 |
| 7. | − 0.0 | 1.1523 | 51.2% | 10. |

Figure 6:
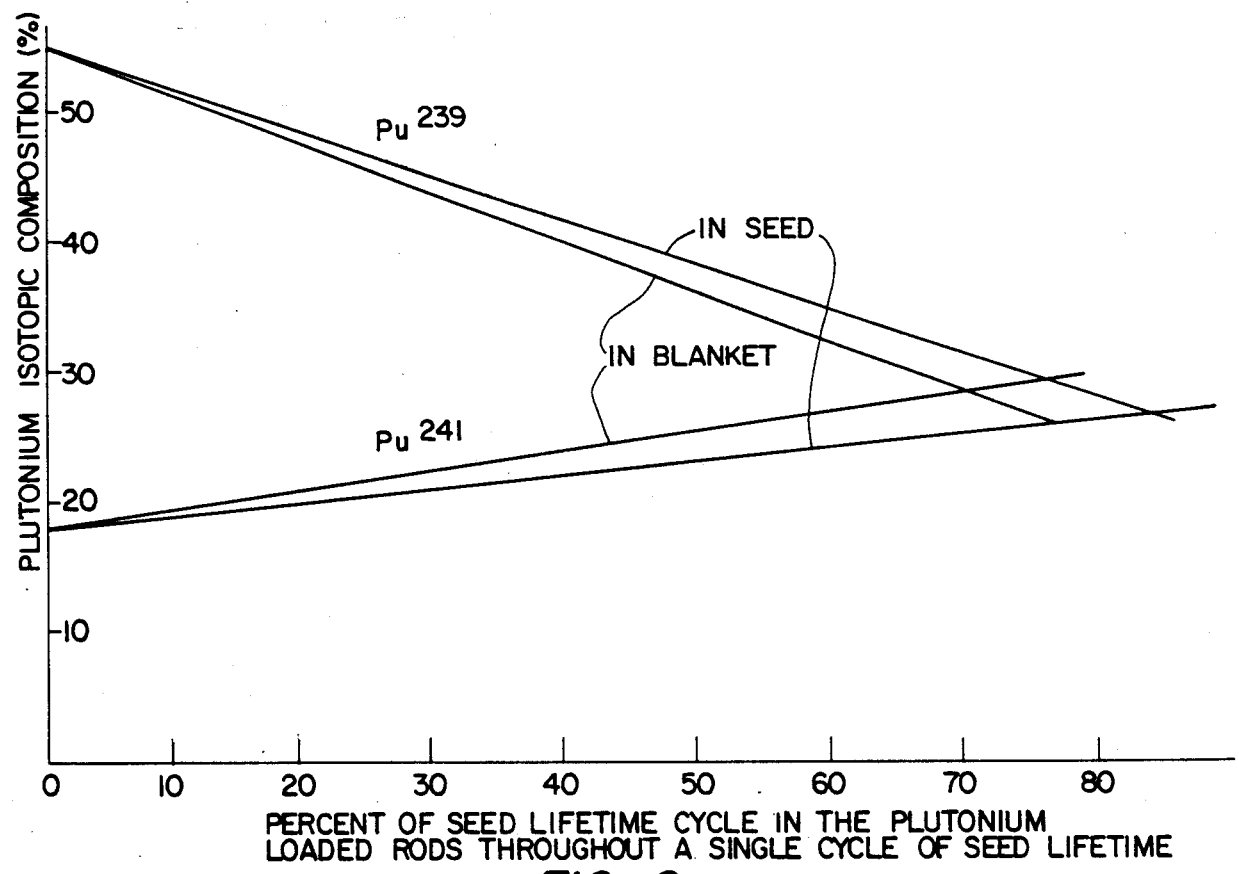
FIG. 6 is a graph illustrating the variation of plutonium isotopic concentration in the plutonium loaded rods throughout a single cycle of seed lifetime.

FIG. 6 depicts the variation of the Plutonium isotopic composition in the Pu-Zr fuel rods during a cycle. It is seen that the fraction of Pu-241 tends to approach that of Pu-239 resulting in a plutonium composition highly favorable for breeding.

In operation, in order to increase the breeding rate, the present invention provides a method of separating the Pu-239 and Pu-241 and the means for operating on an epithermal spectrum. In accordance with the present invention, there are provided some modules (FIG. 3A and FIG. 3B), or an entire core, which are used as a prebreeder. As alluded to hereinabove, the basic idea of the prebreeder is to put the plutonium loaded (FIG. 2) into the core into separate rods of low absorbing material such as zirconium, zircalloy, BeO, PuO or BiO, which are preferably quite small diameter rods 41 of (FIG. 4A and FIG. 4B). The U-238 is put into the core, preferably in the form of relatively large diameter rods of depleted uranium rods 42 of (FIG. 4A and rods 44 of 4B). Thus at the beginning of life all the plutonium is in the plutonium fueled rods. This also helps heat transfer inasmuch as these rods are able to withstand much higher power densities than the larger uranium oxide rods. In addition, performance under loss of coolant accident is much improved since plutonium fueled rods have little stored heat. At the end of core life, the Pu-239 content in the plutonium fueled rods will be much reduced, since there is no U-238 to replenish it, while the percentages of Pu-240 and Pu-241 will correspondingly increase. In the meantime, the Pu-239 will build up in the depleted uranium oxide rods. The plutonium with hi Pu-241 content is then taken from the plutonium in both seed and blanket and used in the breeder module (see FIG. 7). In this case, the breeding ratio is about 1.4 and in accordance with the invention, most of the Pu-241 can be depleted yielding a very high gain of plutonium, mostly Pu-239. In addition, the Pu-242 formation is very low because of the extremely low alpha of Pu-241 at epithermal energies.

Figure 7:
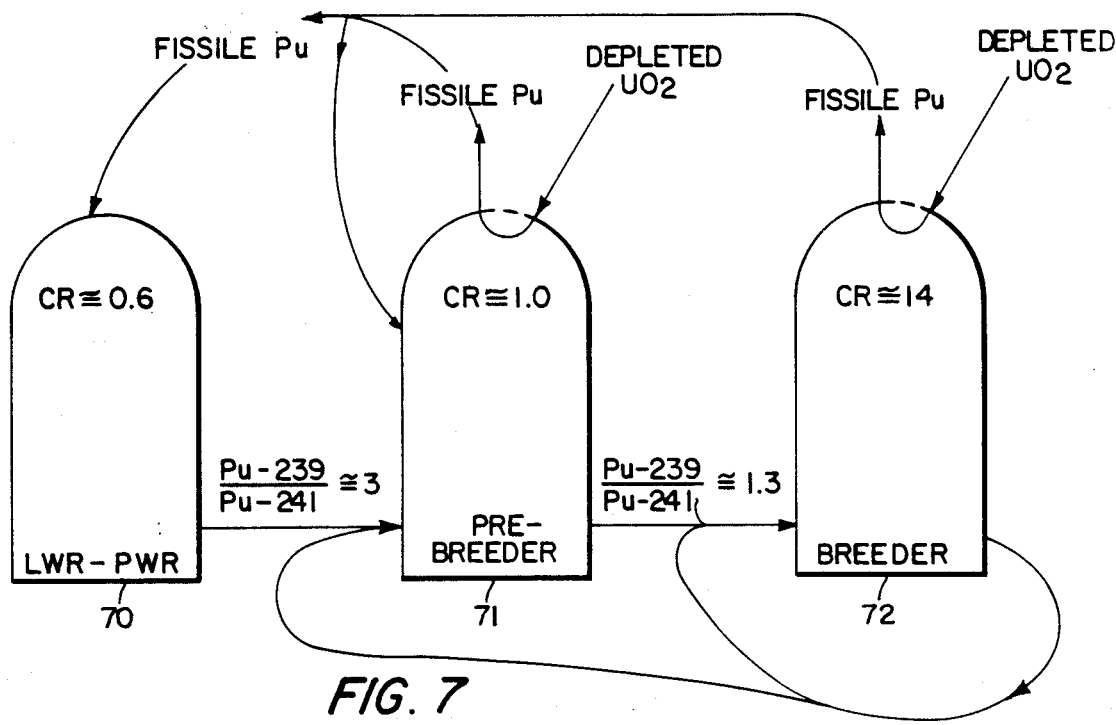
FIG. 7 is a flow diagram illustrating a schematic description of the fuel cycle.
Figure 8:
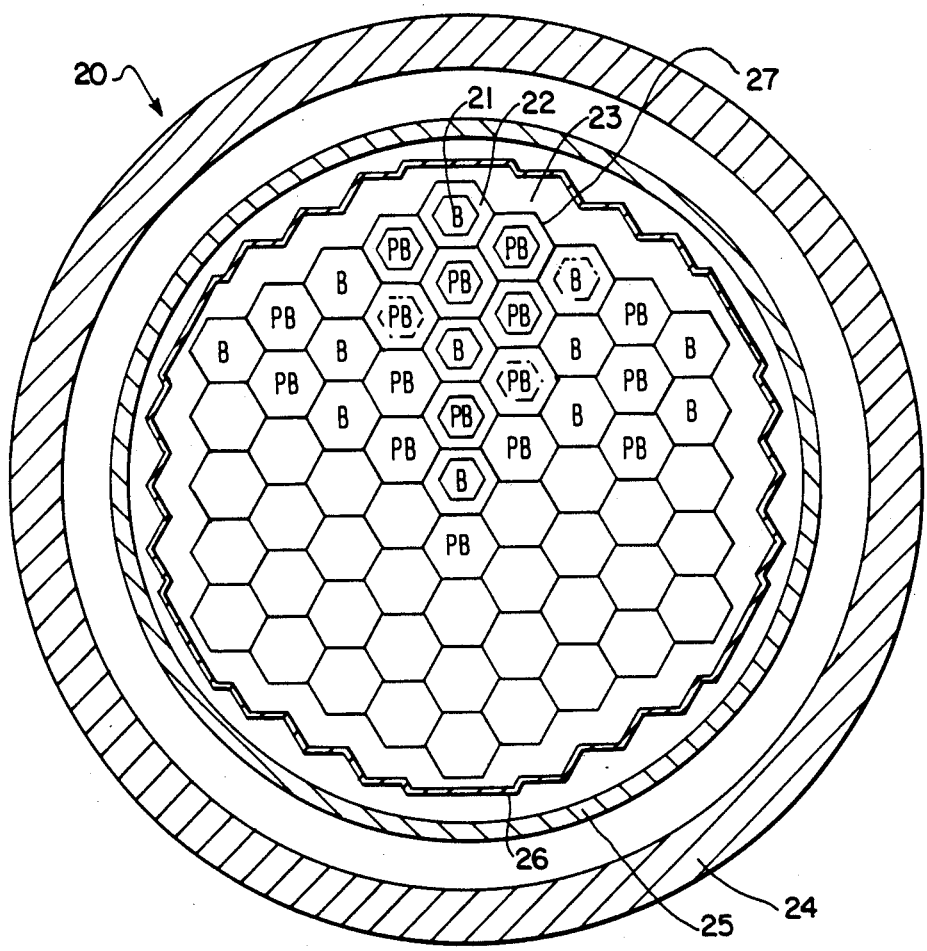

The fuel cycle of the High Gain Light Water Breeder Reactor (HGLWBR) is depicted schematically in the flow diagram of FIG. 7. It starts with the Pu discharged from LWR-PWR 70 with a composition of 55% Pu-239, 22% Pu-240, 18% Pu-241, and 5% Pu-242, which is inserted into the Prebreeder 71 in the form of Pu-Zr rods (or Pu with other low absorbing material as specified previously). Since there is no U-238, the Pu-239 in these fuel elements is not replenished. As the core operates, the Pu-239 is depleted in these zirconium fuel elements, and neutrons are absorbed in Pu-240 to form Pu-241. Upon completion of cycle one in the prebreeder, the Pu-Zr fuel rods are removed from the seed. The Pu composition is approximately equal amounts of Pu-239, Pu-240 and Pu-241, respectively. The depleted UO$_2$ rods generate Pu$^{239}$.

So in fact a "separation process" between LWR type Pu and Pu highly enriched in 241 is achieved.

The plutonium should preferably be uniformly distributed in the plutonium containing rods, for example, as an alloy in the zirconium rods. The moderator to fuel volume ratios are about the same as in the LWBR, 5.0 to 1 in the seed and 0.3 to 1 in the blanket. Thus the blanket has less moderation, which makes the Pu-240 absorption increase. In addition, as mentioned above, the blanket contains depleted uranium rods, to make the blanket reactivity low enough to ensure that the seed is controlling. This is necessary from a neutron conservation standpoint. In these uranium rods the Pu-239 builds up and compensates the depletion of the Pu-239 in the zirconium rods.

Due to the much higher $\eta$ of Pu-241 as compared to $\eta$ of Pu-239 in the epithermal regions, a conversion ratio of close to 1 can be achieved in the prebreeders and a conversion ratio of up to 1.4 can be achieved in the breeder 72. A net breeding gain of up to 40% can be achieved with the HGLWBR.

As alluded to above, the breeder is similar in its mechanical construction to the prebreeder with the plutonium in separate rods. The plutonium fuel in the breeder is of course the high grade plutonium discharged from the separate plutonium rods of the prebreeder.

Moreover as indicated by the fuel cycle depicted in FIG. 7, the plutonium from the depleted oxide rods can be recycled to the PWR-LWR after each cycle. In addition, the plutonium discharged from the plutonium rods of the breeder may be mixed with the plutonium discharged from the prebreeder.

The advantages of the HGLWBR in accordance with the invention are summarized below:
(1) can serve as PWR replacement core, using existing technology.
(2) produces a negative void coefficient.
(3) the seed blanket design provides good neutron economy.
(4) requires only low fissile loading.
(5) produces a net breeding gain of up to 40%.

As mentioned above, the core of the nuclear reactor of the present invention is of the multiple seed blanket type and is similar to that of LWBR. In addition, it employs geometry control by suitable zoning and moving the seed since this method of control results in maximum conservation of neutrons and also ensures a good negative temperature coefficient of reactivity as a result of leakage of neutrons from the more highly reactive seed to the less reactive blanket.

A very important aspect of the present invention is that unlike the LMFBR, the core of the present invention has a high negative void coefficient. This can be seen from an examination of the beginning of life operating conditions summarized in Table 5 below.

TABLE 5

| B.O.L. Operating Position | |
|---|---|
| Water Density Nominal Water Density | Keff |
| 1.0 | 0.9998 |
| 0.9 | 0.9907 |
| 0.8 | 0.9811 |
| 0.7 | 0.9711 |
| 0.5 | 0.9487 |

The neutronic and thermohydraulic constraints imposed on the design parameters given in the exemplary Tables 1–4 above are given below:
(1) Maximum permitted linear power in the Pu-Zr rods should not exceed 24 KW/ft.
(2) Maximum core pressure drop should not exceed 70 psi.
(3) Core coolant average temperature rise should be between 60°–70° F.
(4) The core has to fit into a standard PWR pressure vessel.
(5) A hot channel factor of 3.15 is assumed.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, neither the exemplary design constants nor the exemplary design parameters should be construed to limit or otherwise restrict the invention. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A light water receptor (LWR) for breeding fissile material using a uranium-plutonium cycle comprising:
   a prebreeder section having plutonium fuel containing a Pu-241 component, said prebreeder section being operable to produce enriched plutonium having an increased Pu-241 component; and
   a breeder section for receiving the enriched plutonium from the prebreeder section, said breeder section being operable for breeding fissile material from said enriched plutonium fuel.

2. The LWR of claim 1, wherein said prebreeder section and said breeder section each comprise an LWR core and wherein said prebreeder LWR core produces the enriched plutonium for the breeder LWR core.

3. The LWR of claim 1, wherein said prebreeder section and said breeder section each comprise LWR modules and wherein said prebreeder LWR modules produce the enriched plutonium for the breeder LWR modules.

4. The LWR of claim 1, wherein said prebreeder section has a breeding ratio of about one.

5. The LWR of claim 4, wherein said plutonium fuel further comprises a Pu-239 component and said prebreeder section is operable to convert at least some of said Pu-239 component into Pu-240 and Pu-241.

6. The LWR of claim 5, wherein said prebreeder section further comprises first fuel elements comprising said plutonium fuel clad with low neutron absorption material and second fuel elements comprising fertile material in the form of depleted uranium oxide fuel elements.

7. The LWR of claim 6, wherein the low neutron absorption material is selected from the group consisting of zirconium, zircalloy, ZrO, BeO, PbO and BiO.

8. The LWR of claim 6, wherein said prebreeder section has a conversion ratio of on the order of unity over a cycle of operation.

9. The LWR of claim 8, wherein the breeder section comprises a plurality of fuel modules, each of said fuel modules comprising fuel elements containing plutonium discharged from said prebreeder section and uranium.

10. The LWR of claim 9, wherein the uranium is in the form of one of depleted, natural and low enrichment uranium.

11. The LWR of claim 9, wherein both the prebreeder and breeder sections each comprise a plurality of modules and the breeder section modules are essentially the same size and shape as said prebreeder section modules.

12. The LWR of claim 9, wherein said breeder modules have a breeding ratio of about on the order of 1.4.

13. The LWR of claim 1, wherein said prebreeder section has an active core comprising a plurality of modules, each of said prebreeder section modules comprising a center seed region having a neutron multiplication factor greater than one, a surrounding blanket region having a neutron multiplication factor less than one, and means for moving said seed region.

14. The LWR of claim 13 further including a breeder section having an active core comprising a plurality of modules and wherein said breeder section modules are substantially independent of said prebreeder section modules.

15. The LWR of claim 14, wherein said prebreeder and breeder section modules are assembled in separate pressure vessels to form separate cores.

16. The LWR of claim 14, wherein said prebreeder and breeder section modules are assembled in a single pressure vessel to form a single composite core.

17. The LWR of claim, 13 wherein said prebreeder section and said breeder section each have a core cross section comprising a plurality of seed blanket modules, a power flattening region disposed about said plurality of modules, a core baffle surrounding said power flattening region, a thermal shield disposed outside of and enclosing said core baffle and a pressure vessel disposed outside of and containing said thermal shield.

18. The LWR of claim 17, wherein each seed blanket modules comprises:
   a seed active core;
   a lower axial reflector region disposed below said seed active core;

an upper axial reflector region disposed above said seed active core;

a shroud radially enclosing said seed active core and said upper and lower reflector region;

a radial power flattening region disposed radially outward from and circumscribing said shroud.

19. A method of operating a light water nuclear reactor (LWR) for breeding fissile material using a uranium-plutonium cycle comprising the steps of:

operating said prebreeder to produce enriched plutonium fuel having an increased Pu-241 component;

fueling a breeder section with said enriched plutonium fuel to breed said fissile material.

20. The method of operating a LWR of claim 19, wherein said prebreeder and breeder sections each comprise separate LWR's and further comprising the step of using the enriched plutonium from the prebreeder LWR to fuel the breeder LWR.

21. The method of operating a LWR of claim 19, further comprising the step of using the prebreeder and breeder sections to form separate modules in a common LWR core.

22. The method of operating a LWR of claim 19, wherein said prebreeder section has a breeding ratio of on the order of one and wherein said plutonium fuel further comprises Pu-239 and Pu-240 components and further comprising the step of converting, in the prebreeder section, at least some of the Pu-239 into Pu-241.

23. The method of operating a LWR of claim 22, wherein the step of converting further comprises the step of loading the plutonium fuel into the prebreeder section in separate fuel elements clad with a low neutron absorption material, and loading fertile material into the prebreeder section in the form of depleted uranium oxide fuel elements.

24. The method of operating a LWR of claim 23, further comprising the step of selecting the low neutron absorption material from the group consisting of zirconium, zircalloy, ZrO, BeO, PbO and BiO.

25. The method of operating a LWR of claim 24, wherein substantially all recoverable energy is removed from the plutonium bearing fuel elements.

26. The method of operating a LWR of claim 22, wherein said prebreeder has a conversion ratio of on the order of one over a cycle of operation and further comprising the step of separately processing, at the end of a cycle of operation, fuel in the plutonium bearing elements of the prebreeder section for use as feed fuel for the breeder section, the prebreeder section effectively functioning to perform a partial isotopic separation of Pu-240 and Pu-241 components from the Pu-239 component.

27. The method of operating a LWR of claim 26 further comprising the step of providing breeder modules for said breeder section, said breeder modules including fuel elements comprising plutonium fuel reprocessed from said prebreeder section and fuel elements containing uranium.

28. The method of operating a LWR of claim 27, further comprising the step of selecting the uranium from the group comprising depleted, natural or low enrichment uranium.

29. The method of operating a LWR of claim 28 further including the step of providing breeder modules of substantially the same size and shape as said prebreeder modules.

30. The method of operating a LWR of claim 29, wherein the breeder modules have a breeding ratio of about on the order of 1.4 and further including operating said breeder module until the isotopic content of the Pu-240 and Pu-241 components in the plutonium bearing fuel elements becomes substantially the same as the isotopic content of the plutonium discharge from burner and converter burner cores.

31. The method of operating a LWR of claim 30 further comprising the step of feeding the plutonium fuel discharged from said breeder module to the prebreeder.

32. The method of operating a LWR of claim 31 further including the step of using any excess plutonium from the breeder section as fuel for other reactors.

33. The method of operating a LWR of claim 23 wherein said uranium oxide fuel elements comprise mixed oxide fuel elements and further including the step of using plutonium from the mixed oxide fuel elements of the prebreeder section as fuel for the breeder section when said fuel elements have a plutonium isotopic content about on the order of 25% Pu-240 and 20% Pu-241.

34. The method of operating a LWR of claim 33 further including the steps of performing a partial isotopic separation of said mixed oxide fuel elements from said prebreeder section and using the resulting plutonium as fuel for the breeder section.

35. The method of operating a LWR of claim 19 wherein said breeder section has plutonium and uranium fuel elements and further including the steps of fueling the prebreeder section with plutonium discharged from a PWR, (pressurized water reactor); performing a partial isotopic separation of the plutonium in the said prebreeder section whereby the prebreeder section discharge plutonium has increased isotopic components of Pu-240 and Pu-241; feeding the prebreeder section discharge plutonium into said breeder section, said breeder section having a breeding ratio of about on the order of 1.4; at least partially fueling the prebreeder section using fuel discharged from breeder section uranium fuel elements.

36. The method of operating a LWR of claim 22, further comprising the steps of feeding plutonium from a depleted uranium oxide fuel elements to a conventional LWR after a cycle of operation in said prebreeder section.

37. The method of operating a LWR of claim 28 or 36, further comprising the step of cycling plutonium from the uranium bearing fuel elements to a conventional LWR after a cycle of operation in said breeder section.

38. The method of operating a LWR of claim 37, further comprising the step of mixing plutonium from said prebreeder section depleted uranium oxide fuel elements and the plutonium from said uranium bearing fuel elements together before said step of cycling.

* * * * *